United States Patent
Zhu et al.

(10) Patent No.: US 10,691,563 B2
(45) Date of Patent: Jun. 23, 2020

(54) MANAGING SERVICE AVAILABILITY IN A MEGA VIRTUAL MACHINE

(71) Applicant: TELEFONAKTIEBOLAGET L M ERICSSON (PUBL), Stockholm (SE)

(72) Inventors: Zhongwen Zhu, Saint-Laurent (CA); Claes Göran Robert Edström, Beaconsfield (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 159 days.

(21) Appl. No.: 15/918,585

(22) Filed: Mar. 12, 2018

(65) Prior Publication Data
US 2018/0196725 A1 Jul. 12, 2018

Related U.S. Application Data

(63) Continuation of application No. 14/380,398, filed as application No. PCT/IB2014/058787 on Feb. 4, 2014, now Pat. No. 9,952,946.

(51) Int. Cl.
*G06F 11/00* (2006.01)
*G06F 11/20* (2006.01)
(Continued)

(52) U.S. Cl.
CPC .............. *G06F 11/203* (2013.01); *G06F 9/00* (2013.01); *G06F 11/00* (2013.01);
(Continued)

(58) Field of Classification Search
CPC .................................................. G06F 11/1484
See application file for complete search history.

(56) References Cited

U.S. PATENT DOCUMENTS 7,577,722 B1 * 8/2009 Khandekar ......... G06F 9/45558
709/220
7,596,654 B1 9/2009 Wong
(Continued)

FOREIGN PATENT DOCUMENTS

EP 2725749 A1 4/2014
WO 2012106892 A1 8/2012

OTHER PUBLICATIONS

OpenStack Cloud Software from Wikipedia: https://en.wikipedia.org/w/index.php?title=OpenStack&printable=yes; uploaded from the Internet on Jan. 14, 2020; 24 pages.
(Continued)

*Primary Examiner* — Christopher S McCarthy
(74) *Attorney, Agent, or Firm* — Ericsson Inc.

(57) ABSTRACT

According to some embodiments, a virtual machine manager is operable to manage a virtual machine (VM) that spans a plurality of hardware appliances. The virtual machine manager receives a request to provide a service to a device, selects an application instance to provide the service to the device, and forwards the request for the service to the selected application instance. The selected application instance is running in an instance of the virtual machine associated with a first hardware appliance. The virtual machine manager determines session data associated with the service and provides the session data associated with the service to a second hardware appliance of the VM in order to enable the VM to provide high availability of the service to the device.

18 Claims, 10 Drawing Sheets

(51) Int. Cl.
  *H04L 12/24* (2006.01)
  *H04L 29/08* (2006.01)
  *H04L 29/14* (2006.01)
  *G06F 9/00* (2006.01)

(52) U.S. Cl.
  CPC ...... *H04L 41/0668* (2013.01); *H04L 41/5051* (2013.01); *H04L 67/1004* (2013.01); *H04L 67/1034* (2013.01); *H04L 67/148* (2013.01); *H04L 69/40* (2013.01); *G06F 2201/805* (2013.01); *G06F 2201/815* (2013.01)

(56) References Cited

U.S. PATENT DOCUMENTS

| | | |
|---|---|---|
| 2008/0244577 A1 | 10/2008 | Le et al. |
| 2009/0262741 A1 | 10/2009 | Jungck et al. |
| 2011/0023029 A1 | 1/2011 | Diab et al. |
| 2012/0117241 A1 | 5/2012 | Witt et al. |
| 2013/0031544 A1 | 1/2013 | Sridharan et al. |
| 2013/0036208 A1* | 2/2013 | Dochez ................ G06F 9/5077 709/220 |
| 2013/0055254 A1* | 2/2013 | Avasthi ................ G06F 9/5077 718/1 |
| 2013/0185408 A1 | 7/2013 | Ngo |
| 2013/0275805 A1 | 10/2013 | Harper et al. |
| 2014/0130047 A1 | 5/2014 | Wang et al. |
| 2014/0173113 A1 | 6/2014 | Vemuri et al. |
| 2015/0066844 A1 | 3/2015 | Yin et al. |
| 2015/0154057 A1 | 6/2015 | McGrath et al. |
| 2015/0309825 A1* | 10/2015 | Farkas ................ G06F 9/45558 718/1 |
| 2017/0150399 A1* | 5/2017 | Kedalagudde ........ H04W 28/08 |

OTHER PUBLICATIONS

Network Functions Virtualization from Wikipedia: https://en.wikipedia.org/w/index.php?title=Network_function_virtualization&printable=yes; uploaded from the Internet on Jan. 14, 2020; 9 pages.

Symantec™ Storage Foundation and High Availability Solutions 6.1 Virtualization Guide—Linux; Dec. 2013; 166 pages.

\* cited by examiner

MANAGING SERVICE AVAILABILITY IN A MEGA VIRTUAL MACHINE

RELATED APPLICATION

This patent application is a continuation of U.S. patent application Ser. No. 14/380,398 entitled "MANAGING SERVICE AVAILABILITY IN A MEGA VIRTUAL MACHINE" filed on Feb. 4, 2014, the disclosure of which is hereby incorporated herein by reference in its entirety.

TECHNICAL FIELD

Particular embodiments relate generally to virtual machines and more particularly to managing service availability in a mega virtual machine.

BACKGROUND

A virtual machine (VM) may refer to a software implementation of a computer or other machine that runs programs. A virtual machine may be deployed in a cloud computing environment in which hardware resources may be distributed over a network, such as the Internet. The hardware resources in the cloud computing environment can be allocated to services that the cloud provides to users over the network. Examples of services that can be provided in a cloud computing environment include Software as a Service (SaaS), Infrastructure as a Service (IaaS), and Platform as a Service (PaaS).

SUMMARY

According to some embodiments, a virtual machine manager is operable to manage a virtual machine (VM) that spans a plurality of hardware appliances. The virtual machine manager receives a request to provide a service to a device, selects an application instance to provide the service to the device, and forwards the request for the service to the selected application instance. The selected application instance is running in an instance of the virtual machine associated with a first hardware appliance. The virtual machine manager determines session data associated with the service and provides the session data associated with the service to a second hardware appliance of the VM in order to enable the VM to provide high availability of the service to the device.

In some embodiments, a hardware appliance in communication with a virtual machine (VM) includes one or more processors and memory. The memory contains instructions executable by the processor, whereby the hardware appliance is operable to receive a request for a service from the VM and to provide the service to a device. The VM spans a plurality of hardware appliances, including the hardware appliance and a second hardware appliance. The hardware appliance provides session data associated with the service to a VM manager on behalf of the VM. The hardware appliance receives session data associated with services running in the second hardware appliance from the VM manager in order to enable the VM to provide high availability of services to devices.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1A:
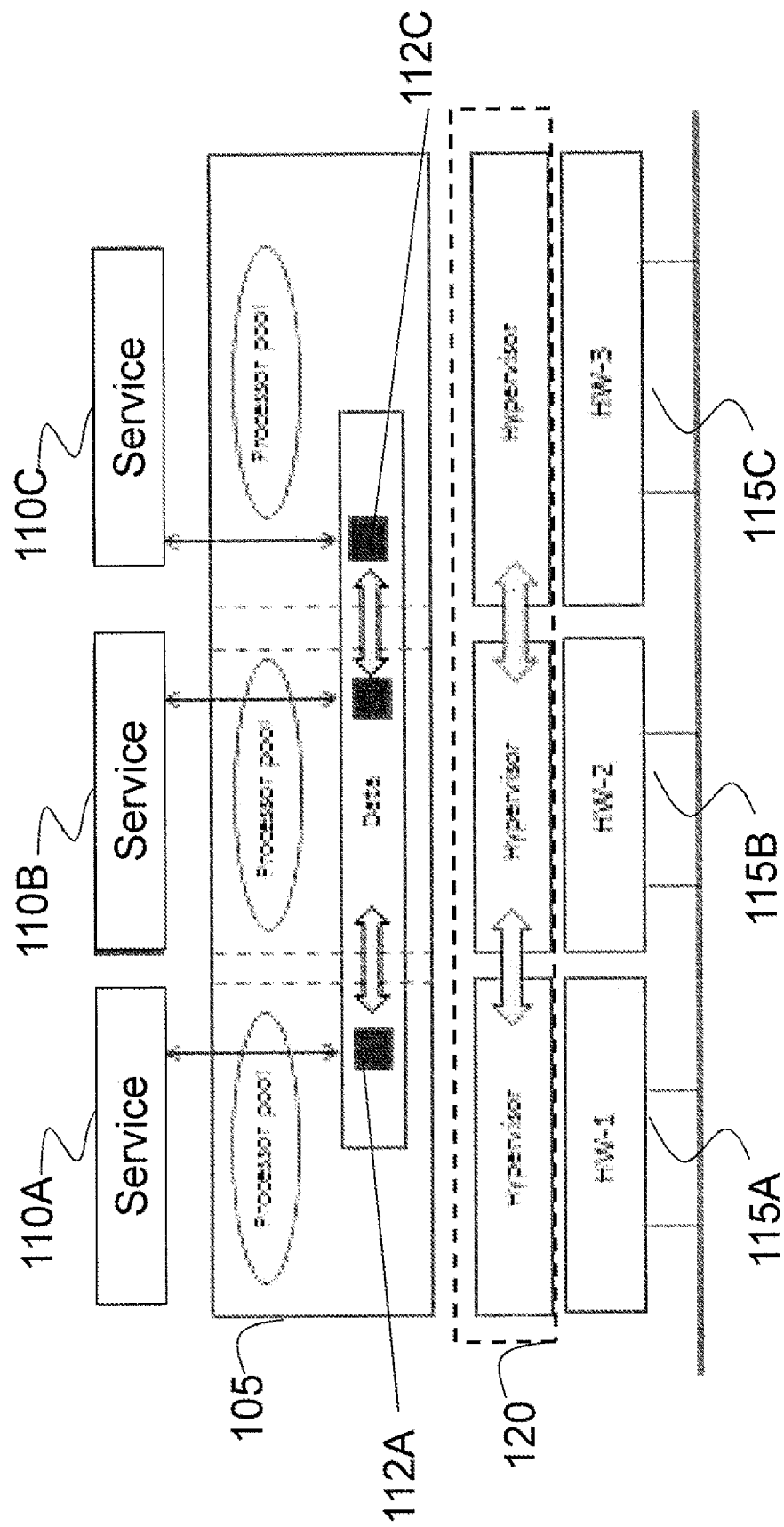
FIG. 1A is a block diagram illustrating an example embodiment of a system.

A virtual machine (VM) may refer to a software implementation of a computer or other machine that runs programs. The virtual machine may run on top of a hypervisor that may provide a specialized operating system for allocating processors, memory, and/or other physical hardware resources to the virtual machine as virtual hardware resources. Each underlying hardware appliance may support one or more virtual machines at a given time. For example, one or several virtual machines may be deployed on one hardware appliance. Or, one virtual machine may span several hardware appliances (e.g., a mega virtual machine (MVM)). A virtual machine may be deployed in a cloud computing environment in which the hardware resources may be distributed over a network, such as the Internet.

A goal of virtual machine design may be to provide high availability, which may prevent a single point of failure in software and hardware. Thus, if a failure occurs, high availability may allow for recovery to be completed with minimal downtime. However, existing approaches to virtual machine design fail to provide high availability (e.g., telecom grade high availability) at the service level. For example, if a hardware appliance becomes unavailable or if a virtual machine crashes, existing approaches may restart the virtual machine on a new hardware appliance using a stored backup configuration. Restarting the virtual machine may require several minutes of downtime during which services that were running on the failed hardware or failed virtual machine may remain unavailable. In addition, in existing approaches, the session data that was being used prior to the failure is not available on the new virtual machine on another hardware appliance (even after the same application instance is launched).

In an attempt to minimize downtime, certain existing approaches may include fault tolerance (FT) techniques. A fault tolerance technique may enable virtual machines to run in lockstep mode such that a standby virtual machine can take over the operations of a failed virtual machine. A problem with fault tolerance is that it requires a complete mirroring (copy) of the virtual machine which requires significant additional capacity both in terms of signaling overhead (to send configuration information between the primary and standby virtual machines) and resource capacity (to duplicate the primary virtual machine in the standby virtual machine). Furthermore, fault tolerance does not protect against faults at the service level because errors on the primary virtual machine are copied to the standby virtual machine.

Particular embodiments may provide a solution to these and other problems. For example, in some embodiments, session data associated with a service provided by a first hardware appliance may be replicated in a second hardware appliance under the same MVM. If a failure occurs in the first hardware appliance, the second hardware appliance may use the session data to recover the service thereby providing high availability at the service level. Particular embodiments are described in FIGS. 1-9 of the drawings, like numerals being used for like and corresponding parts of the various drawings.

FIG. 1A illustrates an example of a system (e.g., a datacenter) that includes a virtual machine 105 spanning a plurality of hardware appliances 115A, 115B, and 115C. In some embodiments, virtual machine 105 may be referred to as a mega container or a mega virtual machine (MVM). The system also includes a virtual machine manager 120, such as one or more hypervisors spanning hardware appliances 115 associated with virtual machine 105. The system may provide services 110 to devices, such as mobile phones, smart phones, personal digital assistants (PDAs), computers (e.g., desktop computers, laptop computers, tablet computers, servers, etc.), machine to machine (M2M) devices, and so on. As used in the present disclosure, examples of services may include any suitable services and/or applications that virtual machine 105 provides to device, such as services/applications provided in a cloud computing environment. Examples may include, but are not limited to, social networking applications, search engine applications, phone or video conference applications, and so on. In general, virtual machine 105 may provide services 110 to devices and virtual machine manager 120 may route traffic within virtual machine 105 and distribute session data 112 to provide high availability as described in more detail with respect to the examples below.

In some embodiments, a user may send a request for a particular service, such as service 110A, via the user's device. As an example, service 110A may display the user's social networking profile. The system may receive the request at virtual machine manager 120. Virtual machine manager 120 may select an application instance of virtual machine 105 to provide service 110A to the device. In the example, the application instance may correspond to an instance of the social networking site running in virtual machine 105. The application instance (e.g., the social networking site) may provide the requested service (e.g., display the user's social networking profile).

In some embodiments, virtual machine manager 120 may select the application instance based on the current traffic load. For example, virtual machine manager 120 may select an application instance if the load associated with the application instance is relatively low. As an example, an application instance may have an associated capacity, such as 100 calls. If a first application instance is handling 10 calls and a second application instance is handling 90 calls, virtual machine manager 120 may select the first application instance to provide the requested service 110A. Or, as another example, virtual machine manager 120 may select the application instance based on the current traffic load of an underlying hardware appliance 115. If a first application instance is running on a lightly loaded hardware appliance 115 and a second application instance is running on a heavily loaded hardware appliance 115, virtual machine manager 120 may select the first application instance to provide service 110A. Thus, in some embodiments, virtual machine manager 120 may act as a load balancer to route traffic within virtual machine 105.

Virtual machine manager 120 may send a request to use the selected application instance to provide service 110A to the device (e.g., so that the device can use the service provided by the application instance). In some embodiments, virtual machine manager 120 may send the request to the selected application instance via first hardware appliance 115A. The selected application instance may provide service 110A and may create or update session data 112A associated with service 110A to the device. In some embodiments, session data 112A may include service level data related to the use of service 110A. In some embodiments, session data 112A may include user content used within the service, such as one or more of text, drawings, photographs, video, audio, messages, and user files (e.g., word processing files, slide presentations, spreadsheets, etc.). As an example, if the user uses service 110A to upload a photograph to the user's social networking profile, the photograph may be included in session data 112A. As another example, if the user requests a communications service, such as a video conference, session data 112 may include user identifiers associated with the participants in the video conference.

In some embodiments, the selected application instance stores session data 112A in its cache. Virtual machine 105 manages this cache so that when session data 112A is created and stored, virtual machine 105 is notified. This may be a trigger for VM 105 to send a request to virtual machine manager 120 to duplicate session data 120 to the other hardware appliances 115 under the same VM 105. Virtual machine 105 may provide session data 112A to virtual machine manager 120 through first hardware appliance 115A (the underlying hardware appliance for the selected application instance). Virtual machine manager 120 may receive the session data 112A according to any suitable model, such as a sub-notify model, a broadcast model, or a multicast model.

Virtual machine manager 120 may replicate session data 112A associated with service 110A across one or more other hardware appliances 115 of virtual machine 105. For example, virtual machine manager 120 may replicate session data 112A to a second hardware appliance 115B and/or a third hardware appliance 115C. Replicating session data 112A to other hardware appliances 115 may facilitate recovering a failure associated with first hardware appliance 115A. For example, if service 110A fails on first hardware appliance 115A (e.g., due to a failure at the service level, the VM level, or the hardware appliance level), one of the other hardware appliances 115 may resume service 110A using the replicated session data 112A.

Certain examples described throughout the disclosure may refer to communications that virtual machine manager 120 has with or via a hardware appliance 115. In general, such communications may refer to communications between virtual machine manager 120 and an instance of virtual machine 105 that runs on the particular hardware appliance 115. In some embodiments, virtual machine manager 120 determines which VM instance to communicate with based on virtual machine manager 120's knowledge of the mapping between the VM instance and the underlying hardware appliance 105 for that VM instance.

Figure 1B:
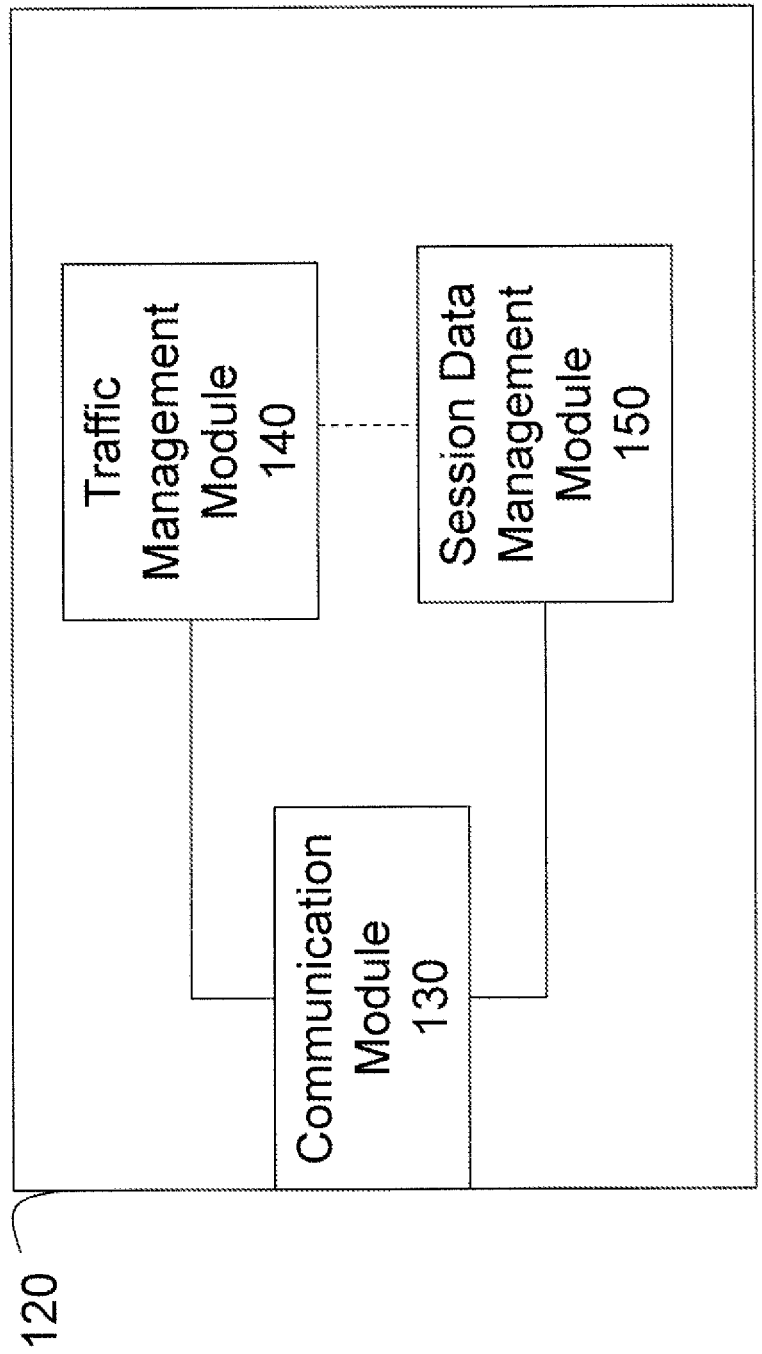
FIG. 1B is a block diagram illustrating an example embodiment of a virtual machine manager.

FIG. 1B illustrates an embodiment of virtual machine manager 120. Virtual machine manager 120 may include a communication module 130, a traffic management module 140, and a session data management module 150. Communication module 130 may send and receive communications between virtual machine manager 120 and hardware appliances 115. Communication module 130 may also send and receive communications between virtual machine manager 120 and devices to which virtual machine 105 provides services.

Traffic management module 140 may allocate services 110 to application instances associated with hardware appliances 115, for example, based on traffic load. The capacity of the application instance could depend on the service design. For instance, one application instance may be able to handle one request at time and another application instance may be able to handle multiple requests, such as 10 requests at a time. Traffic management module 140 may monitor traffic at the application instance level, the VM level, and/or the hardware appliance level in order to assess the traffic load and select resources available to provide service 110. Traffic management module 140 may allocate new requests for services 110. Traffic management module 140 may also allocate existing services 110 (e.g., services that are serving devices), for example, during recovery of a failure. As an example, if hardware appliance 115A becomes unavailable, traffic management module 140 may move a service 110 that was running on hardware appliance 115A to an available application instance (such as an application instance on hardware appliance 115B). In some embodiments, traffic management module 140 may determine to add a new hardware appliance 115 to virtual machine 105 if the current hardware appliances 115 are becoming overloaded or for any other suitable reason.

Session data management module 150 may make decisions as to when and where to replicate session data 112 associated with service 110. Session data 112 may allow for recovering a failure associated with one hardware appliance 115A by resuming a failed service 110 at another hardware appliance 115B using the replicated session data 112. Session data management module 150 may determine to replicate the session data 112 at any suitable time, such as when service 110 has been setup (e.g., in response to receiving session data 112 from the application instance/hardware appliance 115 providing service 110 to the device), when a new hardware appliance 115 has been added to virtual machine 105, and/or on a periodic basis. Session data 112 is replicated at the virtual machine level.

In some embodiments, communications module 130 receives a request to provide a service 110 to a device. For example, communications module 130 may receive the request initiated from the device itself or from a network component that would like to page the device or push data to the device. Communication module 130 may send the request to traffic management module 140, and traffic management module 140 may select an application instance of virtual machine 105 to provide service 110 to the device. Communication module 130 forwards the request for service 110 to the selected application instance via the underlying hardware appliance 115 (e.g., first hardware appliance 115A associated with the selected application instance).

Communication module 130 may also obtain session data 112 associated with service 110 in order to handle the replication of session data 112 throughout the other hardware appliances 115 of virtual machine 105. Communication module 130 may obtain session data 112 in any suitable manner. As an example, the virtual machine running on the first hardware appliance 115A may send session data 112 to communication module 130 of virtual machine manager 120 according to a sub-notify model, a broadcast model, a multicast model, or other suitable model. Or, session data management module 150 may instruct communication module 130 to read session data 112 from first hardware appliance 115A through virtual machine 105 according to the identity of the application instance. Session data management module 150 may locate one or more other hardware appliances 115 of virtual machine 105 to send session data 112 associated with service 110. Session data management module 150 may determine to send session data 112 to some or all of the other hardware appliances 115.

In some embodiments, session data management module 150 may communicate with traffic management module 140 to determine where to send session data 112. For example, session data management module 150 may determine to send session data 112 to one or more hardware appliances 115 having a relatively low traffic load. Session data management module 150 may instruct communication module 130 to provide session data 112 associated with service 110 to the one or more other hardware appliances 115 in order to enable virtual machine 105 to provide high availability of service 110 to the device.

Figure 2:
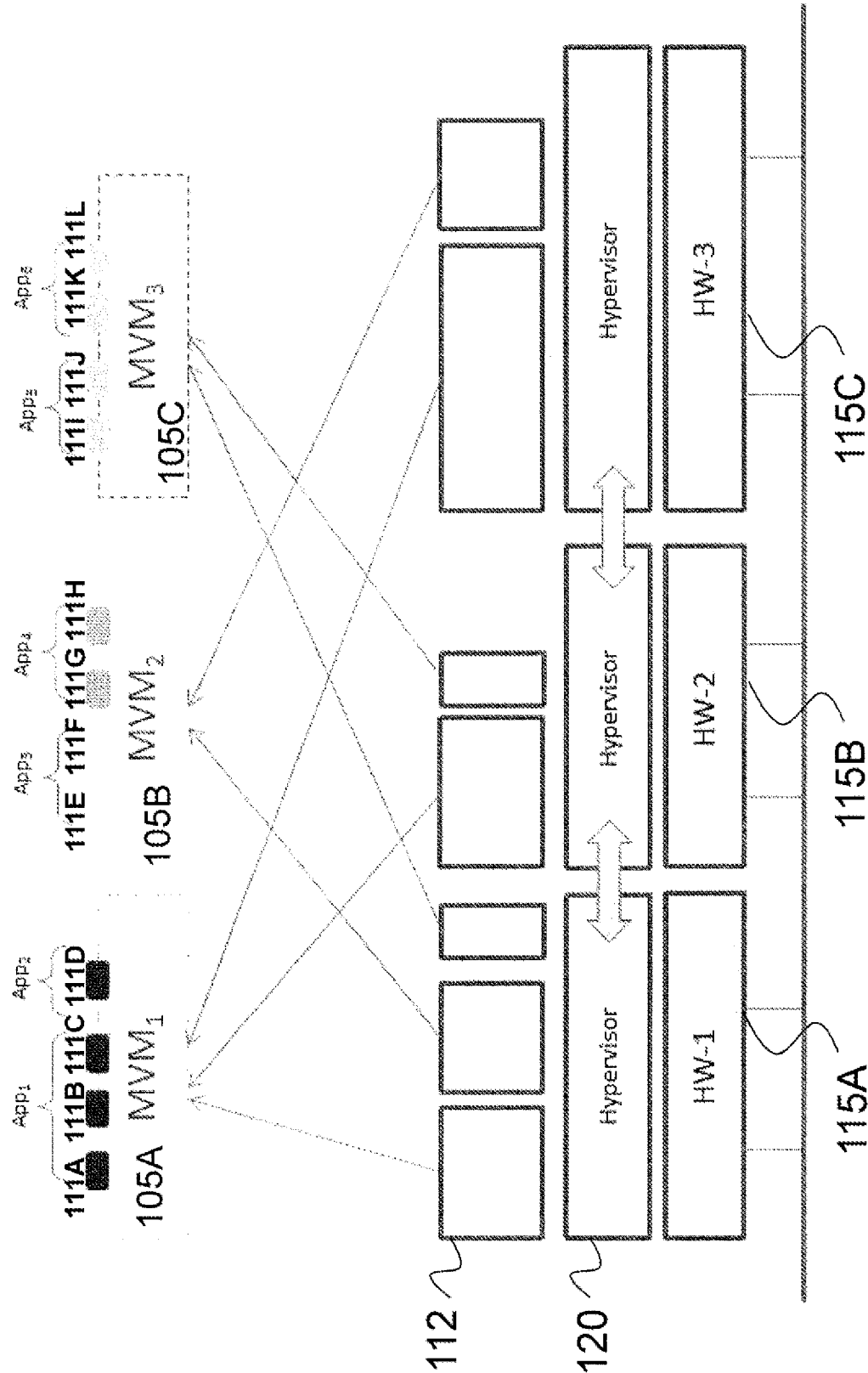
FIG. 2 is a block diagram illustrating an example embodiment of a system.

FIG. 2 illustrates an example in which hardware appliances 115 support multiple virtual machines 105. In the illustrated example, virtual machine 105A spans hardware appliances 115A, 115B, and 115C, virtual machine 105B spans hardware appliances 115A and 115C, and virtual machine 105C spans hardware appliances 115A and 115B. Thus, virtual machines 105A, 105B, and 105C each correspond to separate/distinct virtual machine containers.

Virtual machine 105A provides application instances 111A, 111B, and 111C (each corresponding to App1) and application instance 111D (App2). Application instances 111A, 111B, and 111C may form an application instance pool for App1. Thus, if a device requests App1, any one of application instances 111A, 111B, and 111C may be selected to provide the service, for example, depending on traffic load. As an example, App1 may correspond to a social networking site and App2 may correspond to a video conference service. Application instances 111A, 111B, and 111C may each provide an instance of the social networking site. Each instance may have an associated capacity (such as a certain number of users or call operations supported). Each application instance 111A-D (e.g., App1 and App2) may run on any hardware appliance 115 associated with virtual machine 105A (e.g., hardware appliance 115A, 115B, or 115C). Thus, instances 111A-C of App1 may be provided on the same or different hardware appliances associated with virtual machine 105A. In some embodiments, session data 112 associated with services 110 provided by application instances 111A-D is replicated to each hardware appliance of the same virtual machine 105A. So, even if all of the instances of App1 (e.g., instances 111A-C) occur on the same hardware appliance (e.g., hardware appliance 115A), the associated session data 112 may be replicated in hardware appliance 115B and/or hardware appliance 115C. This may allow virtual machine 105A to provide high availability to App1 services 110, for example, in the event that hardware appliance 115A fails.

In FIG. 2, virtual machine 105B provides application instances 111E and 111F (the pool of application instances for App3) and application instances 111G and 111H (the pool of application instances for App4). Each application instance 111E-111H may run on any hardware appliance 115 associated with virtual machine 105B (e.g., hardware appliance 115A or 115C). Virtual machine 105C provides application instances 111I and 111J (the pool of application instances for App5) and application instances 111K and 111L (the pool of application instances for App6). Each application instance 111I-111L may run on any hardware appliance 115 associated with virtual machine 105C (e.g., hardware appliance 115A or 115B).

Figure 3:
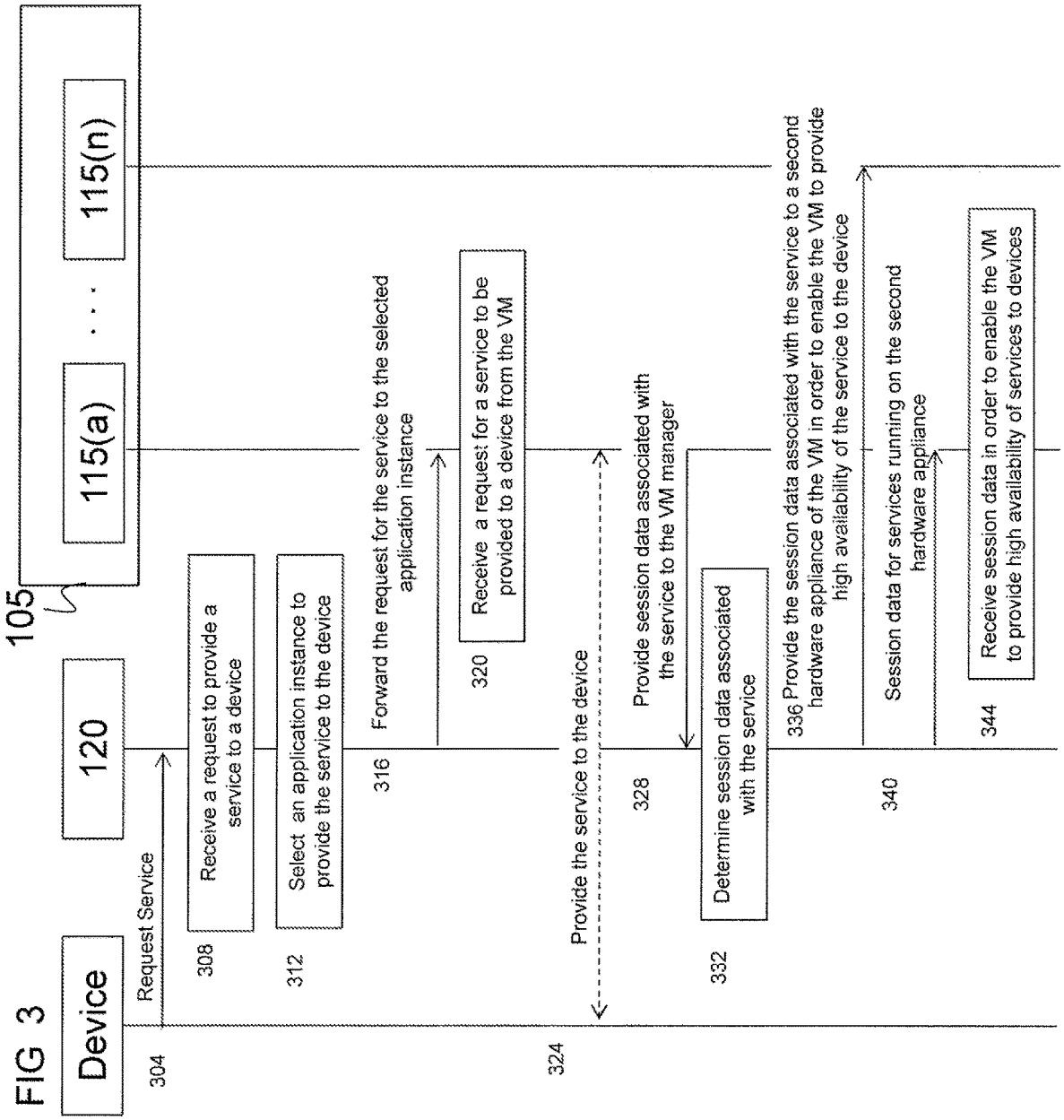
FIGS. 3-5 are signaling diagrams illustrating an exchange of signals in example embodiments of the system.

FIG. 3 is an example of a signaling diagram illustrating an exchange of signals in example embodiments. FIG. 3 illustrates an exchange of signals between a device, a virtual machine manager 120, and a virtual machine 105 managed by virtual machine manager 120. Virtual machine 105 spans a plurality of hardware appliances 115(a) through 115(n). At step 304, the device requests a service 110 to be provided by virtual machine 105. As an example, the device may request to setup a video conference call as service 110. In some embodiments, the device may send the request to an address associated with the requested service 110 offered by an application instance 111 running in virtual machine 105. The address may correspond to an IP address for service 110 published via the Internet. In some embodiments, requests to the address may be received at virtual machine manager 120. For example, the request may first arrive at a firewall of the data center (or cloud center) then proceed to virtual machine manager 120 which may act as a load balancer to route traffic throughout VM 105. Thus, at step 308, virtual machine manager 120 receives the request to provide service 110. Receiving the request at virtual machine manager 120 allows virtual machine manager 120 to route the request to the application instance 111 that virtual machine manager 120 selects to fulfill the request to provide the service to the device.

At step 312, virtual machine manager 120 selects an application instance 111 to provide service 110 to the device. In the example, application instance 111 may correspond to a video conference service that can provide the requested service (the video conference call) to the device. The selected application instance 111 may be running in an instance of virtual machine 105 associated with a first hardware appliance, such as first hardware appliance 115(a) of virtual machine 105. In some embodiments, virtual machine manager 120 selects which application instance 111 should provide service 110 based on traffic load as discussed with respect to traffic management module 140 of FIG. 1B.

Virtual machine manager 120 forwards the request for service 110 to the selected application instance 111 at step 316. The request may be communicated to the selected application instance 111 through hardware appliance 115(a) associated with the selected application instances (as described in FIG. 4 below). At step 320, hardware appliance 115(a) receives the request for service 110 to be provided from VM 105 to the device.

At step 324, the selected application instance 111 provides service 110 to the device. While providing service 110, application instance 111 may create or update session data 112 associated with service 110. In some embodiments, session data 112 may include service level data related to the use of service 110. As an example, in a communications service, such as the video conference call requested for service 110 in the example, session data 112 may include user identifiers associated with the participants in the video conference. If the video conference call supports multimedia functionality, session data 112 could also include user content exchanged within the video conference call, such as one or more of text, drawings, photographs, video, audio, messages, and user files (e.g., word processing files, slide presentations, spreadsheets, etc.). At step 328, VM 105 provides session data 112 associated with service 110 to VM manager 120. VM 105 provides session data 112 through its hardware appliance 115(a), which is the underlying hardware appliance for the selected application instance 111 that provides service 110. Session data 112 may be provided according to any suitable model, such as a sub-notify model, a broadcast model, or a multicast model.

Virtual machine manager 120 determines session data 112 associated with service 110 at step 332. Virtual machine may determine session data 112 in any suitable manner. Thus, determining the session data could include one or more of reading, obtaining, and/or receiving the session data. For example, virtual machine manager 120 may determine session data 112 from a message provided by hardware appliance 115(a) at step 328. Or, in some embodiments, virtual machine manager 120 may read session data 112 from hardware appliance 115(a). In some embodiments, virtual machine manager 120 may determine the session data 112 by receiving a notification of the creation or update of session data 112 related to application instance 111 executing in the instance of virtual machine 105 that runs in first hardware appliance 115(a). Virtual machine 120 may determine session data 112 from or in response to receiving a request to replicate session data 112 associated with service 110 from one hardware appliance (115(a)) to the other hardware appliances (115 (b)-(n)) under the same virtual machine 105.

At step 336, virtual machine manager may provide service 110's session data 112 (such as the user identifiers of participants in the video conference call) to a second hardware appliance 115(n) of the VM in order to enable the VM to provide high availability of service 110 to the device. For example, if any of application instance 111, a virtual machine instance running on hardware appliance 115(a), or hardware appliance 115(a) itself fails/becomes unavailable, a second application instance associated with second hardware appliance 115(n) may resume service 110 using session data 112 previously received by hardware appliance 115(n) at step 336. In some embodiments, virtual machine 105 may include other hardware appliances 115 in addition to the first hardware appliance 115(a) and the second hardware appliance 115(n), and at step 336 virtual machine manager 120 also sends session data 112 to all of the other hardware appliances 115 (the remaining hardware appliances 115).

With respect to failures at the service level, virtual machine manager 120 may determine that the selected application instance 111 has become unavailable to service 110 due to a failure at a service level and may select a second application instance 111 to provide service 110 to the device. If virtual machine 105 is fine (no failure at the VM level), service 110 can be recovered on the VM running on the same hardware appliance as before (115(a)) or the VM running on a different hardware appliance under the same virtual machine 105, such as hardware appliance 115(n). The selection may be made based on traffic load and based on the underlying hardware appliance 115(n) having previously received session data 112 associated with service 110. Virtual machine manager 120 may then request the second application instance 111 to provide service 110 to the device. A more detailed example of handling a failure at the application instance level is described with respect to FIG. 6 below.

With respect to a failure at the VM level, virtual machine manager 120 may be further operable to determine that the first hardware appliance 115(a) has become unavailable to a plurality of existing services (e.g., services that are serving devices, including service 110) due to a failure at the VM level. For each of the existing services, virtual machine manager 120 may select one of the plurality of hardware appliances 115 of VM 105 to provide the existing service based on traffic load and availability of session data 112 associated with the existing service at the selected hardware appliance 115. A more detailed example of handling a failure at the VM level is described with respect to FIG. 6 below.

With respect to a failure at the hardware appliance level, virtual machine manager 120 may be further operable to determine that the first hardware appliance 115(a) has become unavailable to a plurality of existing services (e.g., services that are serving devices, including service 110) due to a failure at the hardware appliance level. Virtual machine manager 120 may determine whether the plurality of existing services can be provided by one or more of the plurality of hardware appliances 115 of VM 105 other than first hardware appliance 115(a). Upon a determination that the plurality of existing services cannot be provided by one or more of the plurality of hardware appliances 115 other than first hardware appliance 115(a), virtual machine manager 120 may add a new hardware appliance 115 to VM 105. Adding a new hardware appliance 115 may include providing session data 112 associated with service 110 (and any other existing service) to the new hardware appliance 115. A more detailed example of handling a failure at the hardware appliance level is described with respect to FIG. 8 below. A more detailed example of adding a new hardware appliance 115 is described with respect to FIG. 5 below.

Returning to FIG. 3, at step 340 virtual machine manager 120 may send first hardware appliance 115(a) session data 112 associated with other services running on other hardware appliances 115, such as a second hardware appliance 115(n) of virtual machine 105. For example, virtual machine manager 120 may send session data 112 to first hardware appliance 115(a) on a periodic basis (e.g., to synchronize session data 112 among all hardware appliances 115 of the same virtual machine 105) or in response to receiving new/updated session data 112 from one or more of the other hardware appliances 115.

At step 344, first hardware appliance 115(a) may receive session data 112 associated with other services running in the second hardware appliance 115(n) from VM 105 (e.g., via virtual machine manager 120). Thus, session data 112 associated with services 110 provided by VM 105 may be replicated to multiple (or all) hardware appliances 115 included within VM 105. Replicating session data 112 in multiple (or all) hardware appliances 115 may enable VM 105 to provide high availability of services to devices. If the particular hardware appliance 115 supporting a service 110 becomes unavailable to the service 110, another hardware appliance 115 may resume service 110 using the associated session data 112. In some embodiments, service 110 may be resumed without incurring the downtime (e.g., several minutes) that may be required to restart a virtual machine and/or without incurring the penalties to signaling overheads and/or capacity that may be associated with fault tolerance techniques.

Figure 4:
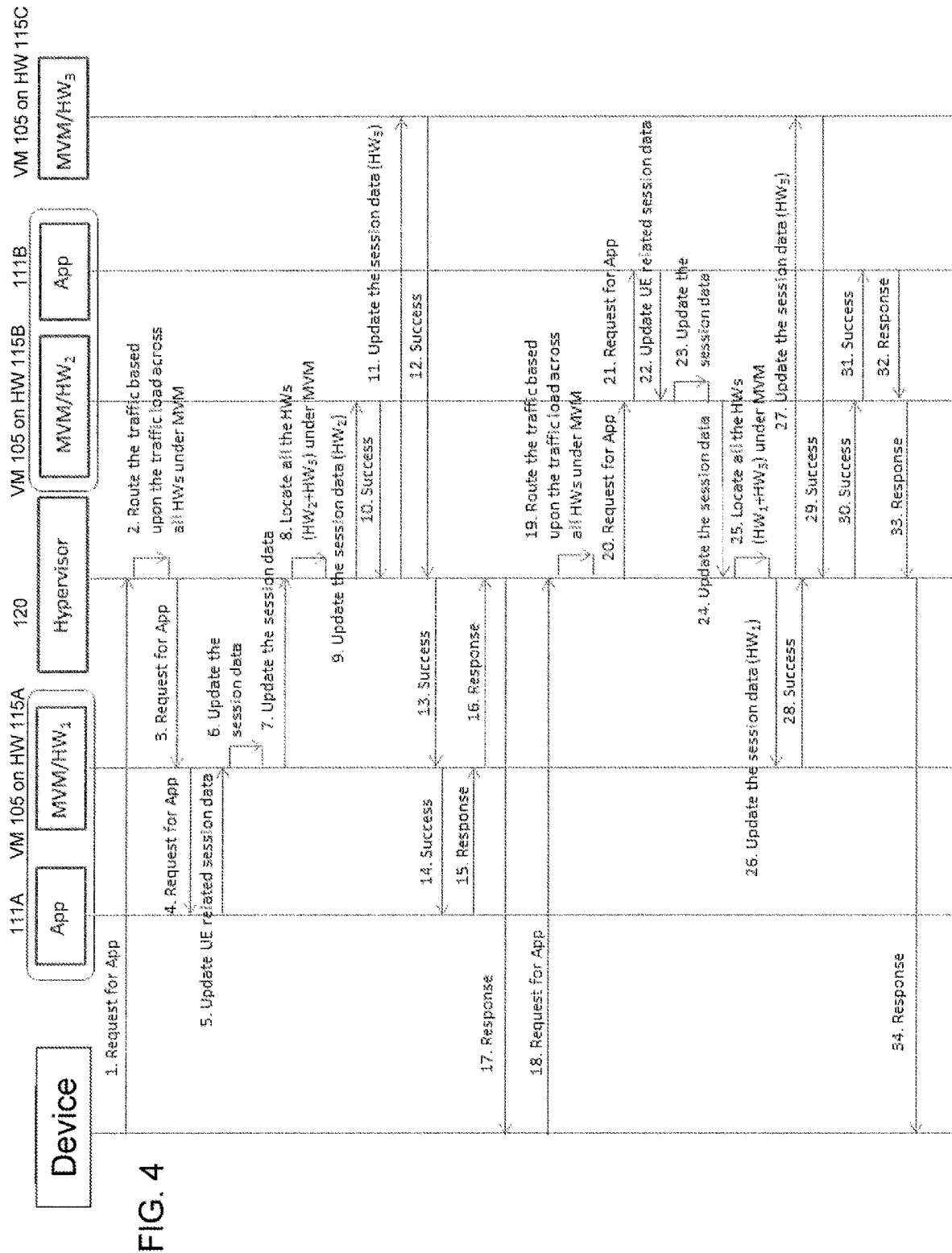

FIG. 4 illustrates an example signal flow for handling session data in an MVM, such as a virtual machine 105 spanning a plurality of hardware appliances 115 (HWs). At step 1, a device requests a service 110 (e.g., App). At step 2, a virtual machine manager 120, such as a hypervisor, receives the request and selects an application instance 111 to provide service 110 to the device. Application instance 111 may be selected from a pool of application instances in the MVM. In some embodiments, virtual machine manager 120 selects application instance 111 based on traffic load. For example, virtual machine manager 120 may select an application instance 111 that has a relatively low traffic load or virtual machine manager 120 may select an application instance 111 associated with a hardware appliance 115 of the MVM that has a relatively low traffic load. As an example, virtual machine manager 120 may select an application instance 111A on HW1 to provide service 110.

At step 3, virtual machine manager 120 sends a request to virtual machine 105 requesting that the selected application instance 111A running on HW1 provide service 110 to the device. In particular, virtual machine manager 120 may send the request to a VM instance running on HW1 (a VM instance may refer to VM 105 running on a particular hardware appliance 115). At step 4, the VM instance on HW1 forwards the request to the selected application instance 111A to provide service 110 to the device. In the process of handling the request, application instance 111A may create or update some session data 112 associated with service 110. Session data 112 may be used for high availability (HA) at the service level by providing session data 112 to other hardware appliances 115 of the same MVM, such as HW2 and/or HW3. For example, at step 5, the selected application instance 111A may communicate session data 112 to the VM instance running on HW1. At step 6, the VM instance running on HW1 updates session data 112, for example, the session might be stored locally in HW1. At step 7, the VM instance running on HW1 communicates session data 112 to virtual machine manager 120.

Virtual machine manager 120 may communicate with the virtual machine instances that run on different hardware appliances 115 under the same MVM to share session data 112 among some or all of the hardware appliances 115 in the MVM. Virtual machine manager 120 may determine which of the hardware appliances 115 to send session data 112 to at step 8. As an example, virtual machine manager 120 may determine to send session data 112 to all of the other hardware appliances 115 in the MVM, such as HW2 and HW3 in the example. At step 9, virtual machine manager 120 may send session data 112 to the VM instance running on HW2. The VM instance running on HW2 may be responsible for storing session data 112 in persistent memory of HW2. At step 10, the VM instance running on HW2 may acknowledge successful receipt of session data 112. At step 11, virtual machine manager 120 may send session data 112 to the VM instance running on HW3. The VM instance running on HW3 may be responsible for storing session data 112 in persistent memory of HW3. At step 12, the VM instance running on HW3 may acknowledge successful receipt of session data 112.

At step 13, virtual machine manager 120 may notify the VM instance running on HW1 that the other hardware appliances 115 have received session data 112. At step 14, the VM instance running on HW1 may notify the selected application instance 111A that the other hardware appliances 115 have received session data 112. At step 15, selected application instance 111A may send a response to the VM instance running on HW1 indicating that it has received the notification that the other hardware appliances 115 have session data 112. At step 16, the VM instance running on HW1 may send the response to virtual machine manager 120 and at step 17 virtual machine manager 120 may send the response to the device (e.g., on behalf of the selected application instance 111A).

At step 18, the device requests a service 110 from the same MVM. At step 19, virtual machine manager 120 receives the request and selects one of the application instances 111 to provide service 110. In some embodiments, virtual machine manager 120 selects application instance 111 based on traffic load. For example, virtual machine manager 120 may select an application instance 111 that has a relatively low traffic load or virtual machine manager 120 may select an application instance 111 associated with a hardware appliance 115 of the MVM that has a relatively low traffic load. As an example, virtual machine manager 120 may select an application instance 111B on HW2 to provide service 110.

At step 20, virtual machine manager 120 sends a request to virtual machine 105 requesting the selected application instance 111B running on HW2 to provide service 110 to the device. At step 21, the VM instance running on HW2 requests the selected application instance 111B running on HW2 to provide service 110 to the device. In the process of handling the request, application instance 111B may create or update some session data 112 associated with service 110. Session data 112 may be used for high availability (HA) at the service level by providing session data 112 to other hardware appliances 115 of the same MVM. For example, at step 22 selected application instance 111B may communicate session data 112 to the VM instance running on HW2. At step 23, the VM instance running on HW2 may update session data 112, for example, the session data may be stored locally in HW2. At step 24, the VM instance running on HW2 may communicate session data 112 to virtual machine manager 120.

Virtual machine manager 120 may communicate with the virtual machine instances that run on different hardware appliances 115 under the same MVM to share session data 112 among some or all of the other hardware appliances 115 in the MVM. Virtual machine manager 120 may determine which of the hardware appliances 115 to send session data 112 to at step 25. As an example, virtual machine manager 120 may determine to send session data 112 to all of the other hardware appliances 115 in the MVM, such as HW1 and HW3 in the example. At step 26, virtual machine manager 120 may send session data 112 to the virtual machine instance running on HW1. The VM instance running on HW1 may be responsible for storing session data 112 in persistent memory of HW1. At step 27, virtual machine manager 120 may send session data 112 to the VM instance running on HW3, for example, so that session data 112 is available or accessible within this VM instance. The VM instance running on HW3 may be responsible for storing session data 112 in persistent memory of HW3. At step 28, the virtual machine instance running on HW1 may acknowledge successful receipt of session data 112. At step 29, the virtual machine instance running on HW3 may acknowledge successful receipt of session data 112.

At step 30, virtual machine manager 120 may notify the virtual machine instance running on HW2 that the other hardware appliances 115 have received session data 112. At step 31, the virtual machine instance running on HW2 may notify the selected application instance 111B that the other hardware appliances 115 have received session data 112. At step 32, the selected application instance 111B may send a response to the virtual machine instance running on HW2 indicating that it has received the notification that the other hardware appliances 115 have session data 112. At step 33, the virtual machine instance running on HW2 may send the response to virtual machine manager 120 and at step 34 virtual machine manager 120 may send the response to the device (e.g., on behalf of the selected application instance).

Figure 5:
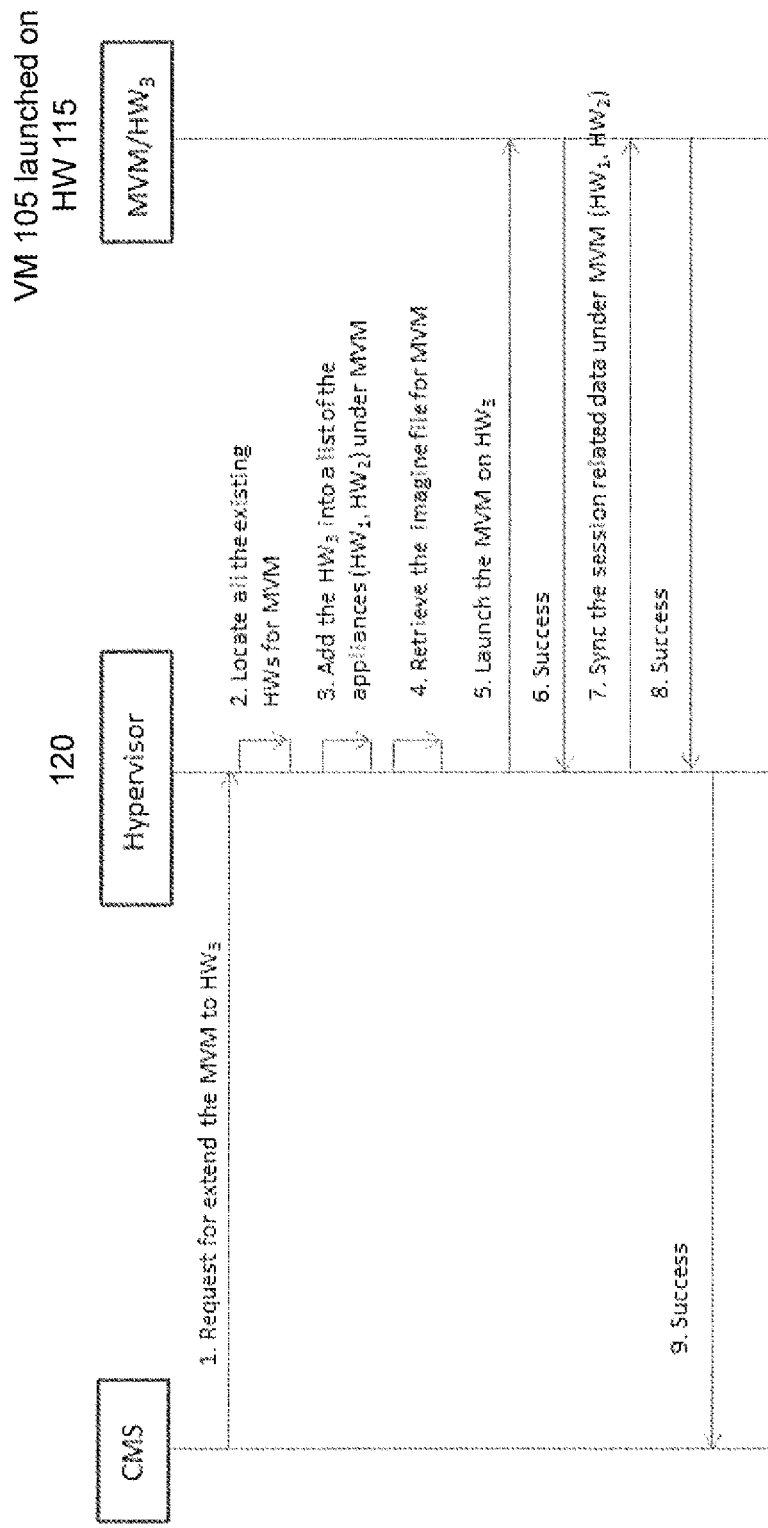

FIG. 5 illustrates an example of a signal flow for adding new hardware to an existing virtual machine 105. As an example, when the load on virtual machine 105 is approaching the maximum capacity of virtual machine 105, a cloud management system (CMS) may determine to extend virtual machine 105 into a new hardware appliance 115 (e.g., HW3 in FIG. 5). In response to the determination, the CMS may send a request to virtual machine manager 120 (e.g., a hypervisor) to extend virtual machine 105 at step 1. At step 2, virtual machine manager 120 may locate all the existing hardware appliances 115 for virtual machine 105, such as HW1 and HW2. At step 3, virtual machine manager 120 adds HW3 to a list of hardware appliances 115 under virtual machine 105. At step 4, virtual machine manager 120 retrieves an image file for virtual machine 105 and uses the image file to launch virtual machine 105 on HW3 at step 5. After virtual machine 105 has been successfully launched on HW3, virtual machine manager 120 is notified at step 6. Virtual machine manager 120 proceeds to step 7 to synchronize/replicate session data 112 to HW3. Thus, the VM instance on HW3 receives session data 112 associated with services 110 provided by other hardware appliances 115 under the same virtual machine 105 (e.g., HW1 and HW2). Receiving session data 112 may prepare the VM instance on HW3 to recover services 110 in the event of a failure. Thus, the VM instance on HW3 may use session data 112 to provide high availability at the service level. At step 8, the VM instance running on HW3 notifies virtual machine manager 120 that session data 112 has been synchronized and at step 9 virtual machine manager 120 notifies CMS that HW3 has been successfully added to virtual machine 105.

Although the preceding example describes the CMS initiating the addition of a new hardware appliance 115, in other embodiments virtual machine manager 120 may initiate adding the new hardware appliance 115 itself as described with respect to FIGS. 6-8 below.

Figure 6:
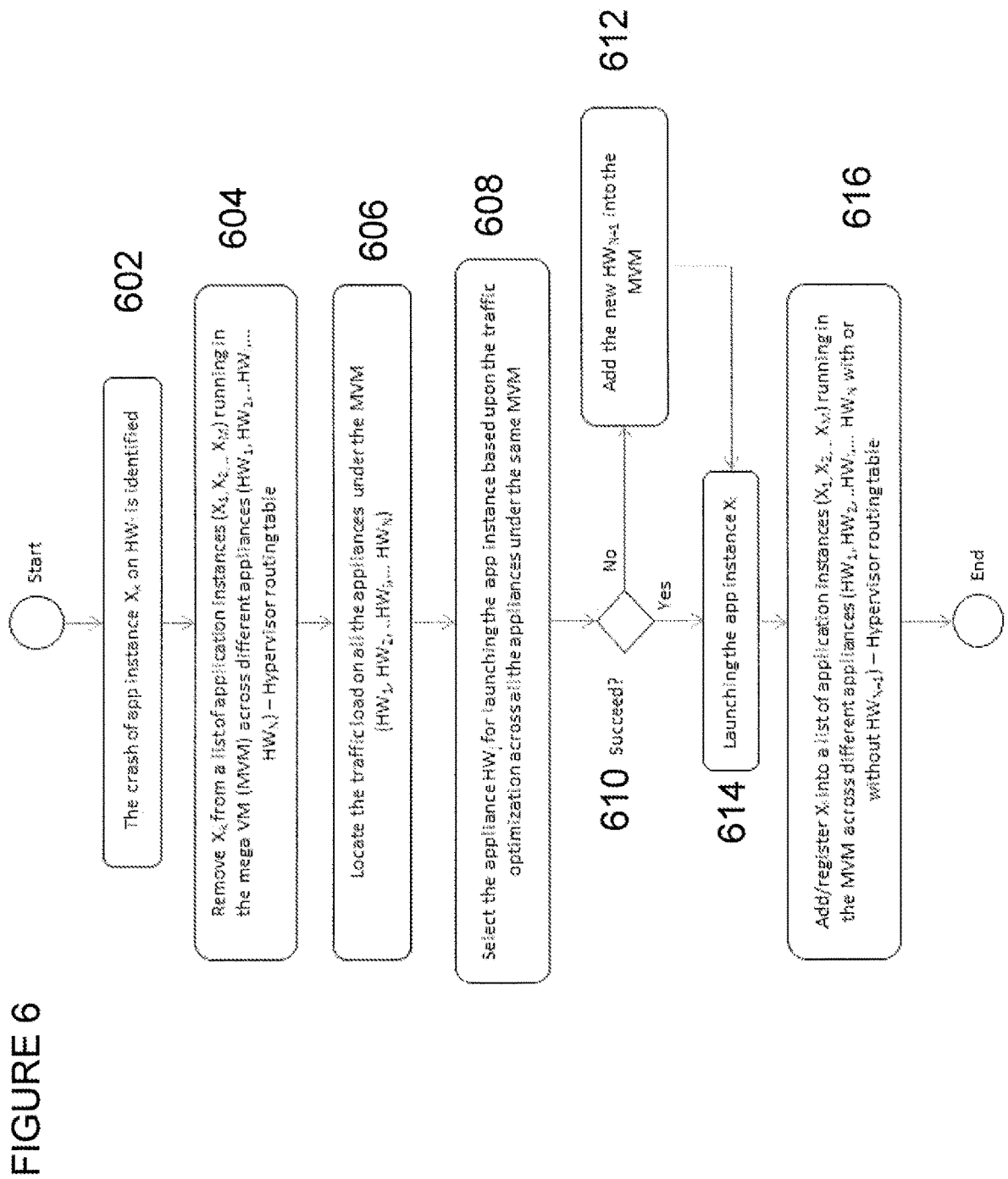
FIGS. 6-8 are flow diagrams illustrating example embodiments of steps that may be performed in the system.

FIG. 6 illustrates an example of a mechanism that may provide high availability in the event of a failure at the service level. At step 602, virtual machine manager 120 may identify the crash of an application instance 111 in virtual machine 105. For example, virtual machine manager 120 may identify the crash of application instance X(k). At step 604, virtual machine manager 120 removes application instance X(k) from its routing table for that service type so that no new request will be sent to application instance X(k). Other instances of service X (e.g., service X(1), X(2), etc.) may remain in the routing table and may continue to run in virtual machine 105. At step 606, virtual machine manager 120 may retrieve the current traffic load from all the hardware appliances 115 under virtual machine 105, such as HW1, HW2, . . . HW(N). Based upon the traffic optimization done across all hardware appliances 115 under the same virtual machine 105, at step 608 virtual machine manager 120 may select the best hardware appliance 115 to launch the application instance again (if any).

If at step 610 virtual machine manager 120 succeeds in finding a hardware appliance 115 to launch application instance X(k), virtual machine manager 120 proceeds to step 614 to send an instruction to virtual machine 105 components running on that hardware appliance 115 to launch application instance X(k). If at step 610 virtual machine manager fails to find an available hardware appliance 115 under virtual machine 105, virtual machine manager 120 may go to step 612 and start the procedure to extend virtual machine 105 into a new hardware appliance 115 (as described with respect to FIG. 5). Virtual machine manager 120 may then launch application instance X(k) on the new hardware appliance at step 614. When application instance X(k) is ready to handle incoming requests, virtual machine manager 120 adds application instance X(k) into its routing table list at step 616.

Figure 7:
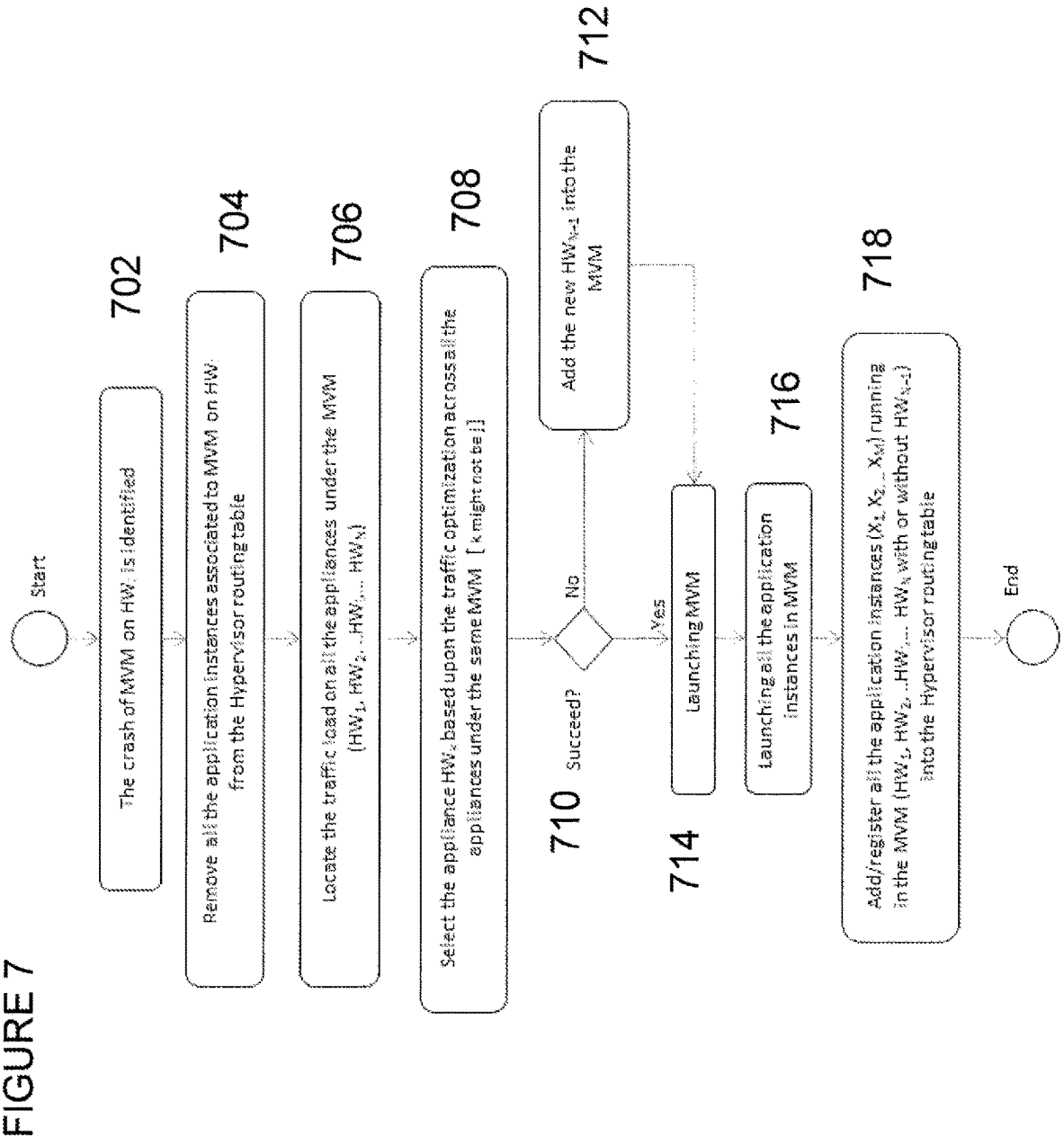

FIG. 7 illustrates an example of a mechanism that may provide high availability in the event of a failure at the virtual machine level. At step 702, virtual machine manager 120 may identify a crash of virtual machine 105. As an example, virtual machine manager 120 may determine that a virtual machine instance VM(i) crashed on hardware appliance HW(i). In response, virtual machine manager 120 may remove virtual machine instance VM(i) from its routing table at step 704. This may prevent new service/application requests from being sent to virtual machine instance VM(i) running on HW(i). Thus, all application instances 111 (and existing services 110) under virtual machine instance VM(i) on HW(i) may not be accessible anymore. However, application instances for the same service running under the same virtual machine 105 but on the other physical hardware appliances 115 (HWs) may still be available and may take in new requests such that service may continue uninterrupted.

At step 706, virtual machine manager 120 retrieves the current traffic load from all the HWs under the same virtual machine 105. Based upon the traffic optimization done across all the HWs under the same virtual machine 105, virtual machine manager 120 selects the best HW to launch the virtual machine at step 708. Here the selected HW might be HW(i) which is the same one as used for the crashed virtual machine instance VM(i). Or, the selected HW might be a different HW. At step 710, if virtual machine manager 120 succeeds in finding a HW within a list of HWs under the same virtual machine 105, virtual machine manager 120 may send the instruction to launch virtual machine 105 on the selected HW at step 714. If at step 710 virtual machine manager 120 fails to find available HW within the existing HWs under the same virtual machine 105, at step 712 virtual machine manager 120 will start the procedure to add a new HW into virtual machine 105 (as described with respect to FIG. 5 above). After launching virtual machine 105 successfully at step 714, virtual machine manager 120 may proceed to step 716 to launch all the application instances in virtual machine 105 (e.g., the application instances affected by the crash of VM(i) on HW(i)). When the application instances are ready for handling incoming requests, virtual machine manager 120 may add these application instances into the routing table list.

Figure 8:
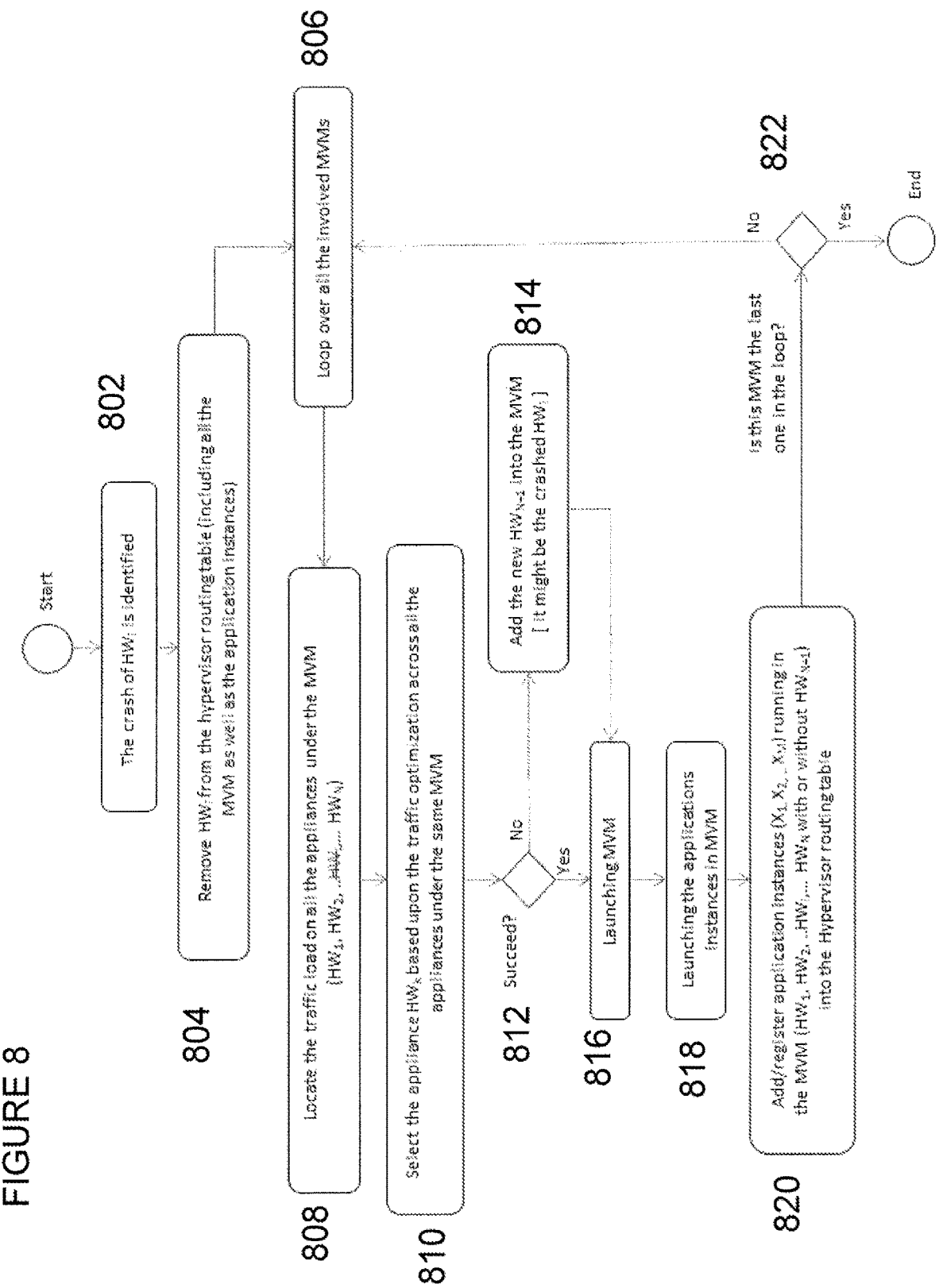

FIG. 8 illustrates an example of a mechanism that may provide high availability in the event of a failure at the hardware appliance level. At step 802, virtual machine manager 120 may identify a crash of a hardware appliance 115, such as HW(i). At step 804, virtual machine manager 120 may remove HW(i) from its routing table so that no new service/application request will be sent to this crashed HW. Any service/application that used to run on HW(i) may become unavailable on HW(i). Similarly, any virtual machines 105 that used to run on HW(i) may become unavailable on HW(i). At step 806, virtual machine manager 120 goes through a list of virtual machines 105 that were previously running on the crashed HW(i). At step 808, for each virtual machine 105, virtual machine manager 120 determines the load on all hardware appliances (HWs) that have been assigned to the virtual machine 105 (excluding the crashed HW(i)). At step 810, virtual machine manager 120 selects a potential HW candidate for each virtual machine 105 based upon the outcome of traffic optimization within the list of HWs that have been assigned to that virtual machine 105. The crashed HW(i) may not be included as a candidate (as indicated in FIG. 8).

If at step 812 virtual machine manager 120 fails to find available HW from the list of the involved HWs, it may request to add a new HW into the corresponding virtual machine 105 at step 814. Example steps for adding a new HW were discussed with respect to FIG. 5 above. At step 816, virtual machine manager 120 launches virtual machine 105 on the HW selected at step 810 (if any) or on the HW added at step 814 (if no HW was selected at step 810). After VM 105 is successfully launched on the selected HW or newly added HW, virtual machine manager 120 instructs virtual machine 105 to launch the corresponding application instances in step 818. At step 820, virtual machine manager adds these services/applications into its routing table after these services/applications are ready for use. The same procedure is repeated for all of the VM instances in the list (e.g., all of the VMs associated with the crashed HW(i)).

Figure 9:
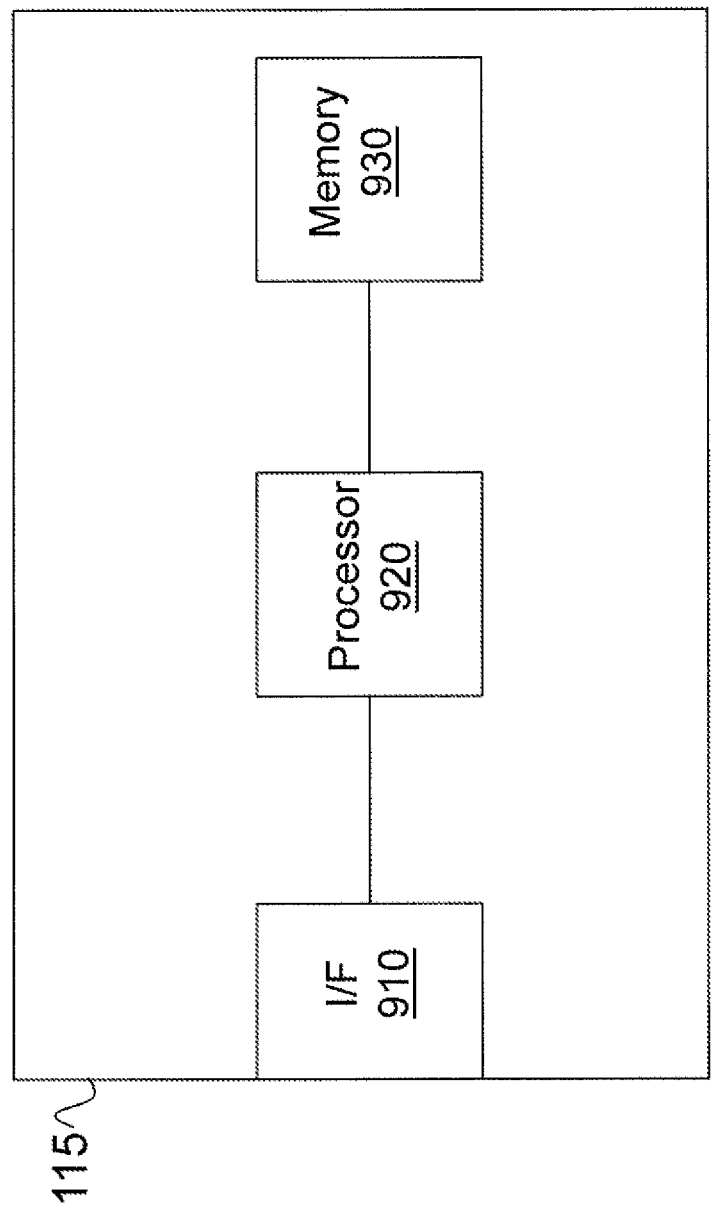
FIG. 9 is a block diagram illustrating an example embodiment of a hardware appliance.

FIG. 9 is a block diagram illustrating embodiments of a hardware appliance 115. Hardware appliance 115 includes interface 910, processor 920, and memory 930. In some embodiments, interface 910 communicates signals to and from hardware appliance 115, processor 920 executes instructions to provide some or all of the functionality described above as being provided by hardware appliance 115, and memory 930 stores the instructions executed by processor 920.

Processor 920 may include any suitable combination of hardware and software implemented in one or more modules to execute instructions and manipulate data to perform some or all of the described functions of hardware appliance 115. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of hardware appliance 115 may include additional components beyond those shown in FIG. 9 that may be responsible for providing certain aspects of the hardware appliance's functionality, including any of the functionality described above and/or any additional functionality (including any functionality necessary to support the solution described above). In some embodiments, virtual machine 105 and/or virtual machine manager 120 may run on one or more hardware appliances 115 and may comprise any interfaces, processors, or memory (e.g., virtualized from/provided by interface 910, processor 920, and/or memory 930 of hardware appliance 115) that may be needed in order to perform any of the functionality described above and/or any additional functionality (including any functionality necessary to support the solution described above).

The following summarizes particular embodiments of the disclosure: a virtual machine manager manages a virtual machine (VM) that spans a plurality of hardware appliances. The virtual machine manager receives requests from devices. For example, the virtual machine manager intercepts a request from an end user device that requests to use a service provided by the VM. The virtual machine manager selects an application instance from a pool of application instances running in the virtual machine. Then it forwards the request to the selected application instance. The selected application instance is running on a hardware appliance, which is part of the hardware associated with the virtual machine. The application instance creates/updates session related data (i.e., session data) when providing the service to the device. To provide continuous service to the end user, the application instance runs at different states corresponding to different session data and configuration data. When the application instance creates/updates session related data, the virtual machine instance in which this application instance is running notifies the virtual machine manager. For example, the application instance generates and caches the session data while providing the service to an end user, and the virtual machine instance (which manages the cache) informs the VM manager to replicate the session related data cached by the application instance. The virtual machine manager then replicates the session related data on the remaining hardware appliances that are associated with the same VM. In this way, this service's session data is available across different hardware appliances under this VM. When one of the hardware appliances under the VM is crashed, the application instance on the remaining hardware appliances can access this session related data and provide/continue the service toward the end user's device.

Some embodiments of the disclosure may provide one or more technical advantages. As an example, in some embodiments, session data associated with a service may be replicated to multiple hardware appliances of a virtual machine to offer high availability at the service level, virtual machine level, and/or the hardware level. A technical advantage of some embodiments may allow a virtual machine to logically stretch over multiple physical hosts such that if one physical host fails, the virtual machine may survive on another physical host. Thus, the impact of a physical host failure may be limited to a capacity loss corresponding to the hardware capabilities of the failed physical host. In some embodiments, this may be achieved by decoupling the virtual machine from the virtual machine manager and the physical host. A technical advantage of some embodiments may enable deployment of clustered services in a cloud environment without having to apply complex virtual machine deployment rules in order to preserve redundancy and resilience. In some embodiments, the solution enables services to be deployed in the cloud without having to use built in resilience mechanisms in the platform which may reduce the complexity of software applications.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
AS Application Server
CMS Cloud Management System
FT Fault Tolerance
HW Hardware
MVM Mega Virtual Machine
OS Operating System
UE Use Equipment
VM Virtual Machine

The invention claimed is:

1. A virtual machine manager managing a plurality of hardware appliances, the virtual machine manager being operative to:
   select a subset of the plurality of hardware appliances for running a virtual machine (VM);
   allocate processor, memory, and other physical hardware resources of the subset of hardware appliances to the VM as virtual hardware resources;
   launch the VM on the selected subset of hardware appliances, the VM comprising the virtual hardware resources and spanning the subset of hardware appliances;
   replicate and synchronize data associated with the VM within the subset of hardware appliances.

2. The virtual machine manager of claim 1, wherein the virtual machine manager comprises a plurality of hypervisors, one hypervisor running on each one of the plurality of hardware appliances.

3. The virtual machine manager of claim 1, wherein the virtual machine manager synchronizes the data of the subset of hardware appliances on a periodic basis or in response to receiving new data from one or more of the subset of hardware appliances.

4. The virtual machine manager of claim 1, wherein the virtual machine manager is further operative to retrieve an image file for the VM and to use the image file to launch the VM.

5. The virtual machine manager of claim 1, wherein the virtual machine manager is further operative to select a new hardware appliance to add to the subset of hardware appliances selected for running the VM.

6. The virtual machine manager of claim 5, wherein the selection of a new hardware appliance to add to the subset of hardware appliances for running the VM is made in response to a determination that a first hardware appliance of the subset has become unavailable or in response to a determination that a load on the VM is approaching a maximum capacity of the virtual hardware resources allocated to the VM.

7. The virtual machine manager of claim 1, wherein the subset of hardware appliances comprises all of the plurality of hardware appliances.

8. The virtual machine manager of claim 1, wherein the virtual machine manager is further operative to remove an allocated hardware appliance from the subset of hardware appliances for running the VM.

9. The virtual machine manager of claim 1, wherein the virtual machine manager is further operative to run a plurality of VMs and comprises a mapping between each VM and the subsets of hardware appliances selected for each VM.

10. A virtual machine manager managing a plurality of hardware appliances, the virtual machine manager being operative to:
    select a subset of the plurality of hardware appliances for running a container;
    allocate processor, memory, and other physical hardware resources of the subset of hardware appliances to the container as virtual hardware resources;

launch the container on the selected subset of hardware appliances, the container comprising the virtual hardware resources and spanning the subset of hardware appliances;

replicate and synchronize data associated with the container within the subset of hardware appliances.

11. The virtual machine manager of claim 10, wherein the virtual machine manager comprises a plurality of hypervisors, one hypervisor running on each one of the plurality of hardware appliances.

12. The virtual machine manager of claim 10, wherein the virtual machine manager synchronizes the data of the subset of hardware appliances on a periodic basis or in response to receiving new data from one or more of the subset of hardware appliances.

13. The virtual machine manager of claim 10, wherein the virtual machine manager is further operative to retrieve an image file for the container and to use the image file to launch the container.

14. The virtual machine manager of claim 10, wherein the virtual machine manager is further operative to select a new hardware appliance to add to the subset of hardware appliances selected for running the container.

15. The virtual machine manager of claim 14, wherein the selection of a new hardware appliance to add to the subset of hardware appliances for running the container is made in response to a determination that a first hardware appliance of the subset has become unavailable or in response to a determination that a load on the container is approaching a maximum capacity of the virtual hardware resources allocated to the container.

16. The virtual machine manager of claim 10, wherein the subset of hardware appliances comprises all of the plurality of hardware appliances.

17. The virtual machine manager of claim 10, wherein the virtual machine manager is further operative to remove an allocated hardware appliance from the subset of hardware appliances for running the container.

18. The virtual machine manager of claim 10, wherein the virtual machine manager is further operative to run a plurality of containers and comprises a mapping between each container and the subsets of hardware appliances selected for each container.

* * * * *